(No Model.)
W. J. FLEMING & F. W. EXLEY.
TIRE FOR VELOCIPEDES.
No. 600,197. Patented Mar. 8, 1898.
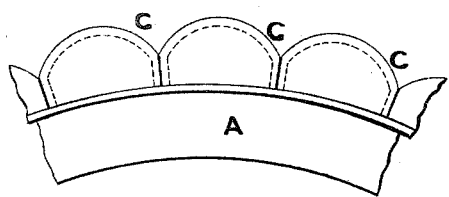
FIG. 1.
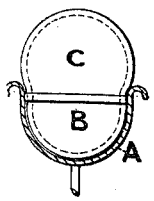
FIG. 3.
FIG. 4.
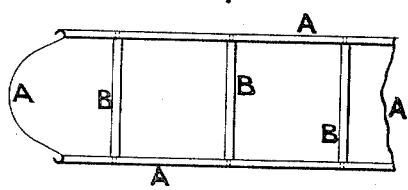
FIG. 2.
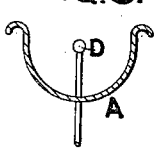
FIG. 5.
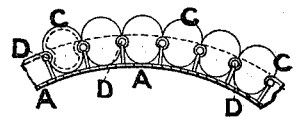
FIG. 6.
FIG. 7.
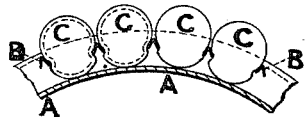
FIG. 8.
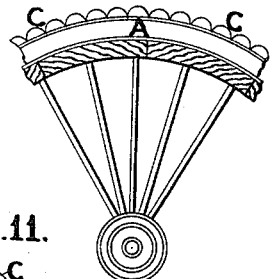
FIG. 9.
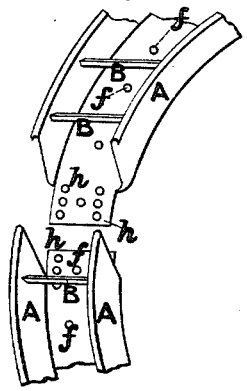
FIG. 10.
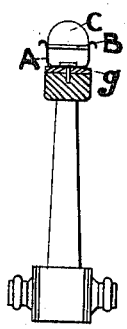
FIG. 11.
Witnesses
Louis B. Kyppas
Fred H. Rhodes
Inventors
Walter James Fleming
Fred Ward Exley

UNITED STATES PATENT OFFICE.

WALTER JAMES FLEMING AND FRED WARD EXLEY, OF HULL, ENGLAND.

TIRE FOR VELOCIPEDES.

SPECIFICATION forming part of Letters Patent No. 600,197, dated March 8, 1898.

Application filed June 28, 1897. Serial No. 642,665. (No model.) Patented in England May 13, 1896. No. 10,208.

*To all whom it may concern:*

Be it known that we, WALTER JAMES FLEMING and FRED WARD EXLEY, subjects of the Queen of Great Britain, residing at Hull, in the county of York, England, have invented new and useful Improvements in Tires for Velocipedes, of which the following is a specification.

A patent for this invention has been obtained in England, No. 10,208, dated May 13, 1896.

The object of our invention is to provide an improved means for attaching hollow balls or the like to the rims of the wheels of cycles or the like for the purpose of holding them firmly in position, so that they cannot slip out, but allowing of their being taken out and turned around, so as to change the worn parts or substitute new ones, and also to get at the spokes, if desired.

In the drawings, Figure 1 shows a side view of part of rim with hollow balls in position. Fig. 2 is a plan view of part of rim, showing transverse pins. Fig. 3 shows sectional cross-view of rim with transverse pins or cross-pieces. Fig. 4 shows view of rim in section with transverse pin and hollow ball in position. Fig. 5 is a sectional cross-view of rim with vertical projection or spoke continued in an upward direction. Fig. 6 shows side view of part of rim partly in section and having vertical projections and hollow balls in position. Fig. 7 shows V-shaped bar with extended ends to pass through side of rim to act as fasteners. Fig. 8 shows side of rim, partly in section, having V-shaped pieces and balls in position. Fig. 9 shows part of carriage or road-vehicle wheel with hollow balls or other shaped bodies in position. Fig. 10 shows a perspective view of rim for attaching to the hoops or tires of carriage or road-vehicle wheels. Fig. 11 shows sectional cross-view of vehicle-wheels having rim with transverse pins and balls in position.

For the purpose of our invention we attach to the inside rim A of the wheel transverse pins or cross-pieces B to form a division. These pins B run across the rim A and are placed at a less distance apart than the diameter of the balls C, which are all hollow. The balls C are pressed in the rim between these partitions B and are held securely in position. The pins at the same time act as stays and strengthen the rim. In the place of these cross-pieces B we may employ projections D, (see Figs. 5 and 6,) formed either by continuing the spoke up through the rim or by placing pins around the center of the rim at suitable distances apart to grip the balls and hold them in position.

The cross-pieces B may be made V-shaped, if desired, one side, *a*, of the V at each end (and preferably opposite side) being longer to allow of them being bent over on the outside of rim A to act as a rivet for fastening purposes. (See Figs. 7, 8, and 9.)

For the wheels of carriages, motor-cars, or other suitable road-vehicles we may construct our rim in the ordinary way, but with a flat bottom, holes *f* being formed in the bottom to take set-screws or the like *g*. (See Fig. 11.) Such rim may be made in segments with overlapping parts *h* to allow of riveting or otherwise fastening such segments to each other. The joinings of these ribs may be made more secure by having plates fastened at either side to form strengthening-pieces and having the edge turned over to match the rim, if desired.

The rim could be placed on the wheel of the vehicle over the ordinary tire or hoop and fastened to it by means of the aforesaid set-screws or the like fastenings.

What we claim as the invention, and desire to secure by Letters Patent, is—

The combination, with a channel-shaped wheel-rim, of a series of cross-pieces V-shaped in cross-section and riveted with their apices outward between the outer edges of the rim and preventing them from spreading, and a series of hollow balls of elastic material forced into the said rim between the said cross-pieces which retain them in position, substantially as set forth.

In testimony whereof we hereunto affix our signatures in the presence of two witnesses.

WALTER JAMES FLEMING.
FRED WARD EXLEY.

Witnesses:
LOUIS E. KOPPAX,
FRED H. RHODES.